(12) United States Patent  
Meltz et al.

(10) Patent No.: US 6,408,119 B1  
(45) Date of Patent: Jun. 18, 2002

(54) UV-TRIMMED FUSED TAPERED COUPLERS

(75) Inventors: Gerald Meltz, Avon, CT (US); Kenneth O. Hill, Kanata (CA)

(73) Assignee: OFT Associates LLP, Avon, CT (US)

( * ) Notice: Subject to any disclaimer, the term of this patent is extended or adjusted under 35 U.S.C. 154(b) by 0 days.

(21) Appl. No.: 09/494,317

(22) Filed: Jan. 28, 2000

(51) Int. Cl.$^7$ ................................................. G02B 6/26
(52) U.S. Cl. ............................. 385/43; 385/39; 385/31; 385/37
(58) Field of Search .............................. 385/43, 39, 37, 385/31

(56) References Cited

U.S. PATENT DOCUMENTS 6,160,932 A * 12/2000 Huang et al. ................. 385/24

OTHER PUBLICATIONS

M.J.F. Digonnet, "Doped Fiber Devices II", Proceedings of SPIE, vol. 3542, pp. 42–49, Nov. 1998.

F. Bakhti, X. Daxhelet, P. Sansonetti, S. Lacroix, "Influence of Bragg grating location in fused 100% coupler for add and drop multiplexer realization", OFC '98 Technical Digest, pp. 333–334.

L. Martineau & S. Lacroix, "Fabrication of highly Ge–doped fibre couplers by fusion–tapering technique", Electron. Lett., vol. 33, pp. 798–800, 1997.

X. Daxhelet & S. Lacroix, "UV–Trimming of Fused Fiber Coupler Spectral Response: A Complete Model", IEEE Photon. Technol. Lett., vol. 10, pp. 1289–1291, 1998.

* cited by examiner

*Primary Examiner*—Rodney Bovernick  
*Assistant Examiner*—Sung Pak  
(74) *Attorney, Agent, or Firm*—M. P. Williams (57) ABSTRACT

A method of trimming fused-tapered couplers, with or without in-fiber Bragg gratings, to form multiplexers, demultiplexers or combinations of both, by either or both of (1) increasing the phase differential between the symmetric and asymmetric supermodes by irradiating one or both ends of the coupler with UV radiation confined transversely to between the cores of the fibers, and (2) decreasing the phase differential between the modes by irradiating a portion of one or both ends of the coupler with two beams of UV radiation, each confined transversely to include a corresponding core and excluding a significant fraction of the space between the cores.

27 Claims, 12 Drawing Sheets

UV-TRIMMED FUSED TAPERED COUPLERS

TECHNICAL FIELD

This invention relates to fused tapered couplers, including those with and those without in-fiber Bragg gratings, the operating parameters of which are trimmed by precisely focused ultraviolet radiation or by means of ultraviolet radiation controlled by precision masks.

BACKGROUND ART

Management of high-capacity broadband channels in a dense wavelength-multiplexed optical network requires the use of low-loss filters that can add (multiplex) or drop (de-multiplex) signals at closely spaced wavelengths. A common means to realize this capability is to use a device that contains one or more fiber Bragg gratings since they can be designed to isolate adjacent channels, avoid cross talk, and have low insertion loss.

Figure 1:
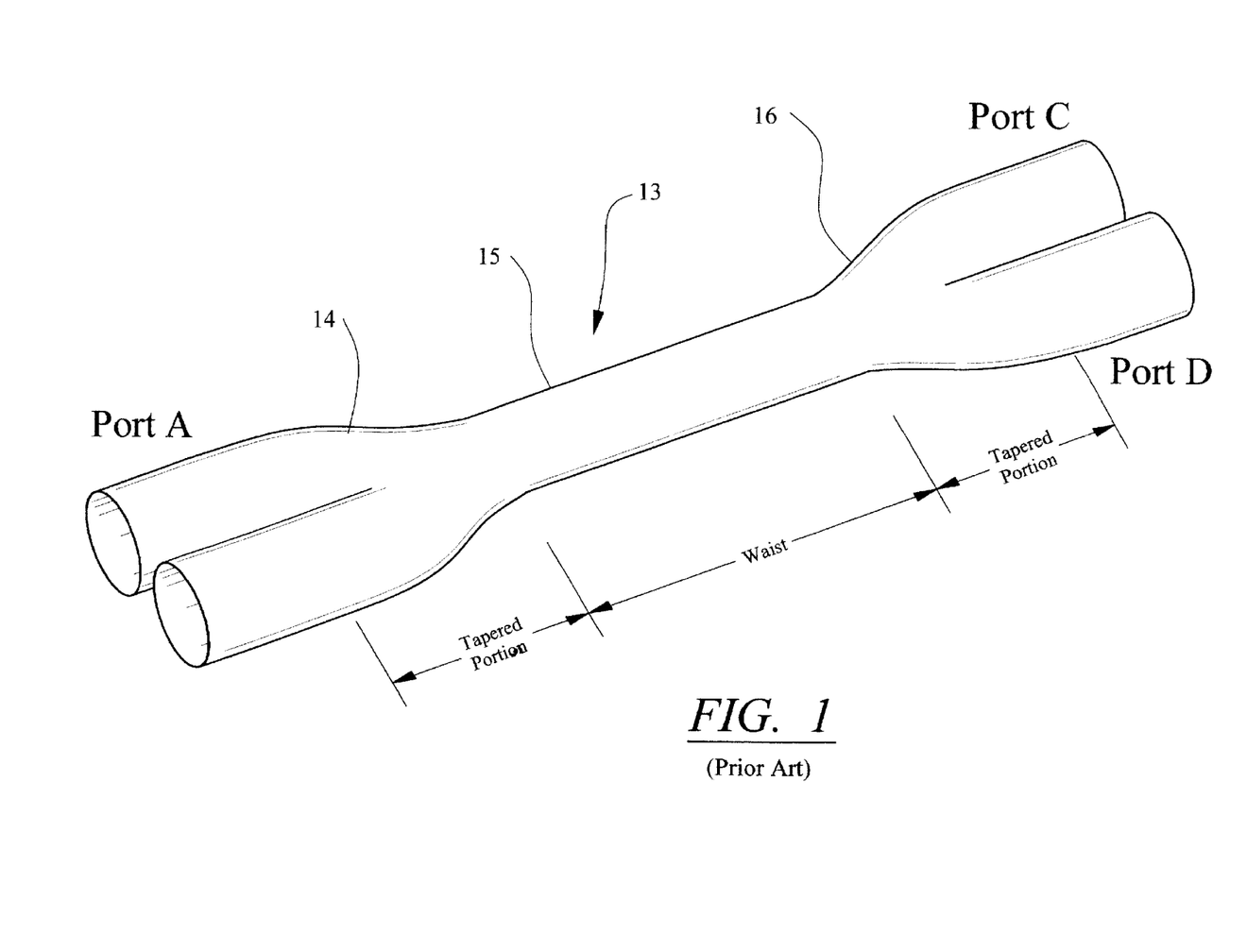
FIG. 1 is a perspective view of a fused-tapered coupler known to the prior art.

It has been known for many years that fused tapered fiber coupler technology can be used to multiplex signals and route channels provided the channels are not too closely spaced. A fused tapered coupler 13 consists of a pair of identical fibers that are fused along a segment of length and then drawn so as to taper down 14 to a small waist 15 and taper up 16 to the original size, as shown in FIG. 1. Light launched into one fiber core (for example, at port A in FIG. 1) couples into the modes of the fused and tapered composite fiber and spreads out to the cladding boundary in the waist 15 of the coupler where the cross section of the cores are reduced. The transverse distribution of light in the fused fiber cycles from one side to the other as the modes propagate along the device. The amount of light which appears in the exit ports, C and D in FIG. 1, is determined by the length of the device, the degree of fusion, the axial profile of the cross section, and the optical wavelength. If the taper is gradual enough, namely if it is adiabatic with regard to the evolution of the modal amplitudes, then the field may be regarded as a liner superposition of the lowest order modes of the fused fiber. These modes propagate at different velocities and consequently interfere. When they are in-phase, the light is concentrated in one-half of the fiber cross-section and when they are in anti-phase it switches to the opposite side. This occurs because the modes of the composite fiber, commonly referred to as supermodes to distinguish them from the modes of an individual single core fiber, are distributed over most of the fiber cross-section with maxima at the core centers, and are even, symmetric about the midplane of the waist cross section, and odd, asymmetric the midplane of the cross-section. The total phase difference, $\Delta\phi$, determines the amount of light that will be coupled from the input fiber at port A to the adjacent fiber at the pass port C and the drop port D.

The coupler is fabricated by drawing the length to the point wherein a desired fraction of the input light appears in the cross-coupled port, C. In the simplest instance, when the wavelength of the light is varied over a small range, the phase will change inversely with the wavelength, and the light will cycle cosinusoidally between the exit ports. The coupler acts as a filter, separating a desired wavelength through interference of the even and odd supermodes of the fused fiber.

As demand for capacity increases and channel spacing is reduced to less than 200 GHz, fused tapered couplers cannot be designed to realize the narrowband filtering capability. However, if an in-fiber Bragg grating (FBG) is incorporated into the waist of a coupler then the spectral characteristics are governed by the grating design rather than by the coupler. See, for example, Kashyap, R., *Fiber Bragg Gratings,* Academic Press, San Diego (1999), Section 6.7, pp. 276–284. Using fibers which are photosensitive, an FBG 18 can be formed in the waist 19 of the coupler 20 (FIG. 2) by ultraviolet light (UV) exposure using a phase mask or a pair of interfering beams. The grating will reflect a portion of each supermode if the wavelength falls within the grating stop-band. The stop-band of the even and odd modes will be very nearly the same; however, they are not identical because the Bragg wavelengths are different. The coupler can be designed so that the Bragg wavelengths of the two modes differ only by a very small fraction of the stop-band by choosing the degree of fusion and taper ratio at the waist. In this device, the filter characteristics are governed by the grating properties, namely, the length, strength and apodization, and by the phase of the reflected and transmitted supermodes.

The presence of the grating changes the phase. In reflection, namely for those wavelengths within the stop-band, the modes reflect before they reach the end of the grating and the phase of each depends on the grating properties. A reflected pulse of light will be delayed by a round-trip time equal to the transit time within the grating. In the case of a weak grating, the mode will appear to be reflected from the center of the grating. If the grating is made stronger, the effective length of the reflection point, as measured by the group delay, will decrease. Thus, with a very strong grating, the reflection will occur at a point quite close to its edge. In transmission, the phase will also depend on the strength of the grating because the average index of the fiber will be increased as a result of the ultraviolet (UV) exposure used to form the grating. The presence of the grating changes the interference of the modes in reflection and in transmission. It follows that the return loss, namely the amount of light that is reflected back into the input port A and thereby lost from the drop port D, may increase. In addition, the coupling ratio, or equivalently, the fraction of the light that is transmitted directly through to port B (leakage) rather than being cross-coupled into port C, will also be changed when the grating is formed.

Precise placement of the grating within the coupler waist, to minimize the return loss and leakage, is difficult because of the tolerances required: location of the grating center with a precision of several hundred microns may be required. And the characteristics of the coupler change as a consequence of the index of refraction changing, due to irradiation by UV light in the process of making the grating.

In X. Daxhelet and S. Lacroix, "UV-Trimming of Fused Fiber Coupler Spectral Response: A Complete Model", IEEE Photonics Technology Letters, Vol. 10, No. 9, pp. 1289–1291, a fused-fiber coupler, in which only the cores are photosensitive, is exposed to UV. This paper concludes that not much change could be expected in the phase difference between the two fundamental supermodes for the case where both core and cladding are photosensitive, as is true for FBG, fused tapered add and/or drop filters. In the case of a drop filter (having no add function), the trimming may be simplified because each end of the device can be exposed separately and independently. However, uniform exposure of the fused fiber, particularly if it has low photosensitivity or uses a doped photosensitive cladding, will not produce a large enough change in the differential phase of the supermodes, even when trimming a drop filter, except in those cases where a very small change will suffice. For an add/drop filter (multiplexer/demultiplexer), the need to trim both sides of the waist is even more acute.

DISCLOSURE OF INVENTION

Objects of the invention include trimming of a fused-taper coupler, with or without a fiber Bragg grating, in a manner to either increase or decrease the phase differential between the symmetric and asymmetric supermodes; compensation for changes produced by grating fabrication in fiber Bragg grating fused-taper couplers; compensation for changes produced by inaccurate location of the Bragg grating in fused-taper couplers; and fused-taper couplers, with or without a fiber Bragg grating, having optimized performance.

This invention is predicated on the discovery that trimming of a fused tapered coupler by UV exposure of a selected portion of the cross section of one or both end regions of the coupler, including regions of the waist (which do not contain the grating of a coupler employing an FBG) and the nearby tapered regions of the coupler, is an effective way to either increase or decrease the differential phase of the supermodes to improve the amount of coupling into the drop port, to reduce the loss of the reflected power into the input port, and to decrease the insertion loss.

According to the present invention, a fused tapered coupler multiplexer and/or demultiplexer is phase adjusted by exposing one or two selectively limited portions of the cross section of one or more lengths of the coupler to ultraviolet light, which is focused precisely, or controlled by a mask having one or two slits, laterally centered on the waist of the coupler, to achieve an appropriate differential phase by favoring a phase change for either the symmetric (even) or asymmetric (odd) supermode, making it possible to trim each section of the fused pair differently, or even separately, if necessary.

In accordance with the invention, the two sides of the waist of a fused tapered coupler are trimmed separately so as to selectively favor adjustment of the index of refraction (index, indices, or n, hereinafter) of either the symmetric or asymmetric supermode, and both sides of the waist of such a coupler may be trimmed so as to be able to substantially optimize both the add function and the drop function, with minimum insertion loss and reflection back to the upstream sources.

In accordance with the invention, exposing a section of the fiber coupler with one or two precise patterns of ultraviolet light, laterally centered on the cross-section, causes a large change in the differential phase, adjusted to favor trimming the index of either the symmetric (even) or asymmetric (odd) supermode. As a result, the differential or beat phase, $\Delta\phi$, can be selectively decreased significantly as well as increased, providing more flexibility in trimming both sides of the device for add and drop functions.

This invention provides the means to trim the device to obtain both add and drop multiplexing with one coupler, with or without an FBG. The mode selective precise trimming method of the invention is especially well-suited for couplers made with a large photosensitive-doped cladding. The use of such a fiber has a twofold advantage: it increases the grating reflectivity for a given change in the index, and also reduces out-of-band cladding mode coupling loss.

The invention may be practiced in couplers employing an FBG as well as couplers not having an FBG. In couplers employing an FBG, the invention allows precise trimming to compensate for index changes brought on by UV radiation when forming the grating, as well as trimming to compensate for positioning and other fabrication variations.

As used herein, the term "end region" includes portions of the waist of a coupler, excluding any portion having an FBG formed therein, or portions of the tapered regions of a coupler in which significant changes can be made in the index of refraction by UV irradiation, or both portions.

Other objects, features and advantages of the present invention will become more apparent in the light of the following detailed description of exemplary embodiments thereof, as illustrated in the accompanying drawing.

BEST MODE FOR CARRYING OUT THE INVENTION

For a given fiber design, the choice of a UV beam size or slit width and its position is made from a knowledge of the degree-of-fusion and the coupler taper-ratio at the waist. They are properties that are accurately controlled during the coupler fabrication and can be measured from a microphotograph of the fused fiber cross-section and a longitudinal profile of the transverse dimensions of the coupler. These parameters determine the field distribution of the lowest order supermodes, as well as the coupling length of the device, which is related to the difference in the effective refractive indices of the two lowest order modes.

According to the invention, the width and position of one or more UV beams are selected to maximize the difference in the overlap of the symmetric and asymmetric supermode fields within the UV-exposed portion of the fiber. To increase the phase difference, the fiber is exposed to a single UV beam that is centered on the fiber midplane; to decrease the phase difference, a pair of beams are positioned on either side of the midplane at a distance that is selected to maximize the change in phase difference. We can estimate the best choice of beam width and position by calculating the supermode field distributions from a model of the coupler waist.

Figure 3:
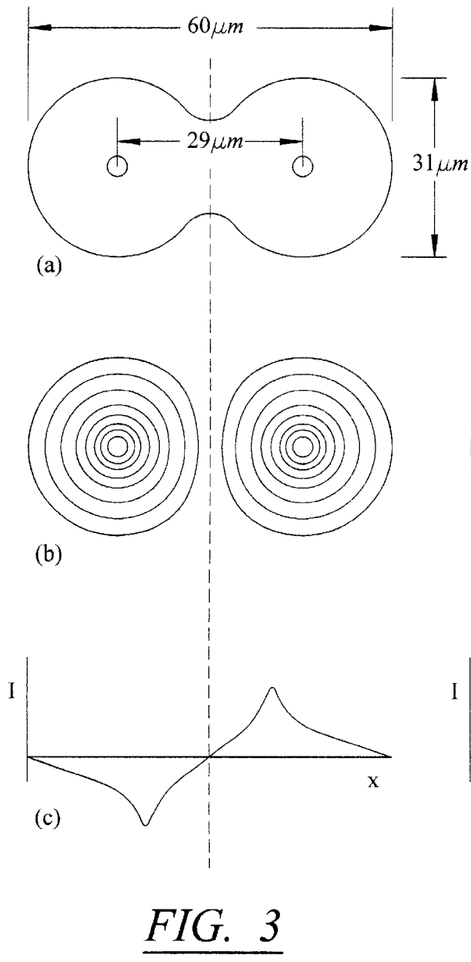
FIG. 3 is a series of illustrations on a common axis of the cross sectional dimensions of a lightly fused coupler, and the distribution of intensity I, as a function of lateral distance, x, across the coupler cross section, of the asymmetric supermode.

For example, consider a coupler that is made from a pair of lightly-fused fibers (small degree-of-fusion) as shown in illustration (a) of FIG. 3, having cores of about two micron diameter. The asymmetric mode field distribution is centered on the cores and goes to zero at the mid-plane of the cross-section, as shown in illustrations (b) and (c) of FIG. 3. In this case, the field intensity decays at about the same rate to either side of the core center (illustration (c), FIG. 3). In contrast, the symmetric mode, which is mirrored in the fiber mid-plane and peaks at the core centers (illustrations (a) and (b) of FIG. 4) falls off more rapidly towards the edge of the fiber cross-section (illustration (b), FIG. 4).

When the fused-fiber is exposed to UV, the increase in the refractive index of the core and cladding induces a change in the effective indices of the modes, which may be estimated to first order from perturbation theory. If $\Gamma$ is the fraction of the supermode power in the UV exposed photosensitive region of the fiber, then $\delta_{neff} = \delta n \, \Gamma$, where $\delta n$ is the average photo-induced index increase. It follows that the change in the differential supermode phase is given by $$\Delta\phi \approx (2\pi/\lambda)(\delta n)(\Gamma_s - \Gamma_a)z_{exp}$$

where the subscripts "s" and "a" refer to the SLP01 and SLP11 (symmetric and asymmetric) fundamental supermodes, and $z_{exp}$ is the length of the exposed region.

Figure 4:
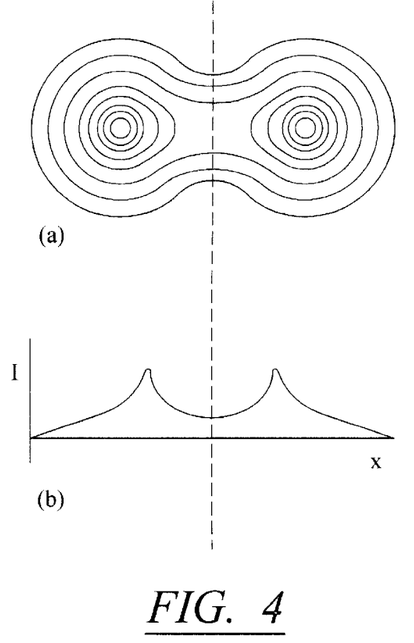
FIG. 4 is a series of illustrations on a common axis illustrating, for a lightly fused coupler, intensity, I, as a function of lateral distance, x, of the symmetric supermode.

Reference to FIG. 3 illustrates that the fraction of supermode power for the asymmetric supermode will be greatest in the cross sectional region centered around the cores, whereas the fraction of the supermode power for the symmetric supermode is seen in FIG. 4 to be greater near the mid-plane of the cross section, than would be the fraction of the power of the asymmetric supermode near the midplane. Therefore, according to the invention, the difference between the phases of the asymmetric supermode (FIG. 3) and symmetric supermode (FIG. 4) can be increased if $\Gamma_s$ is greater than $\Gamma_a$ and can be decreased if $\Gamma_a$ is larger than $\Gamma_s$. It further follows, therefore, that exposing the vicinity of the mid plane to UV radiation will produce a greater effective index increase for the symmetric mode than it does for the asymmetric mode, thereby increasing the difference in supermode phase, and concentrating the UV radiation near the center of the cores will favor the asymmetric supermode, thereby causing a decrease in the phase difference between the two supermodes.

Consider a pair of fibers having 125 micron diameter and cores of ten microns, the cladding and core both being photosensitive, which has been drawn down to about ¼ of its original size, into a lightly-fused tapered coupler having the dimensions shown in FIG. 3, illustration (a).

Figure 5:
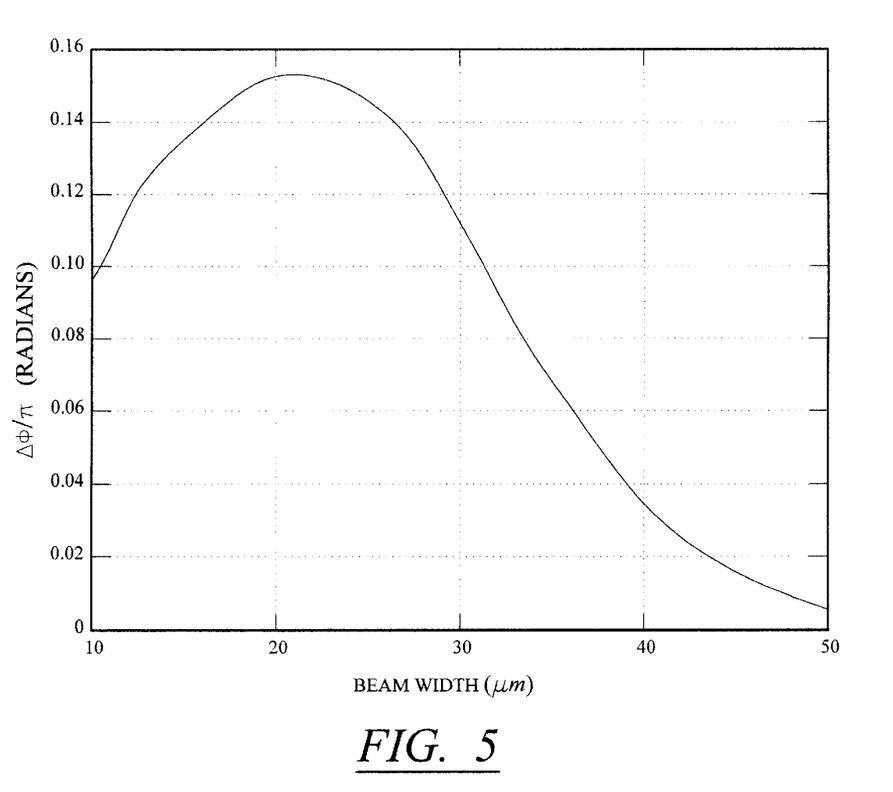
FIG. 5 is a plot of the increase in phase difference between two supermodes as a function of beam width, in a lightly fused coupler.

Calculations of the difference in the overlap between variously sized regions of exposure to ultraviolet light, for a one millimeter exposure length, $z_{exp}$, longitudinally of the coupler fibers, and a UV-induced change in the index of refraction on the averaging $10^{-3}$ over the whole waist, in each of the symmetric and asymmetric fields, separately, for the case of a lightly fused tapered coupler as in FIGS. 3 and 4, yield a plot of differential phase as a function of the width of the UV beam illustrated in FIG. 5. FIG. 5 illustrates that maximal increase in the phase difference (per unit of length of exposure and overall average change in phase) is achieved with a beam having a width, laterally, of about 22 microns.

Figure 6:
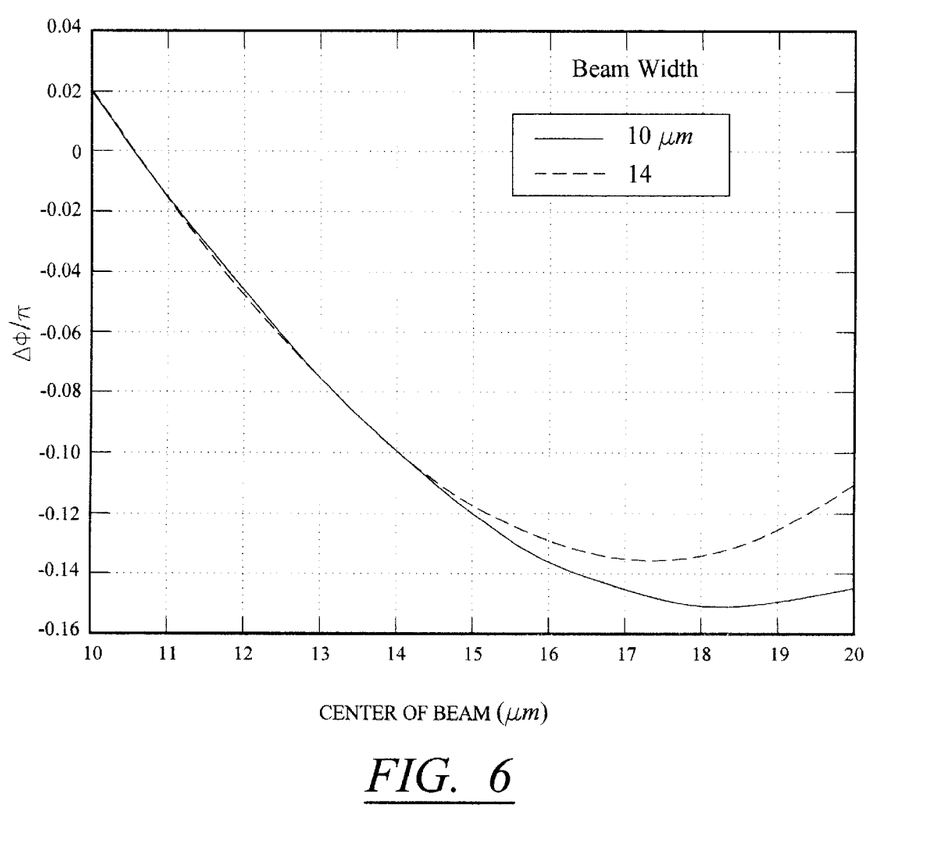
FIG. 6 is plot of decrease in the difference in phase of two supermodes as a function of the positioning of the center of a single UV beam, for two different beam widths, in a lightly fused coupler.

Calculations of the change in phase difference between the symmetric and asymmetric modes as a function of the width of two beams, each of which is centered at a variety of distances from the cross sectional mid-plane of the coupler, yields the plot of FIG. 6. FIG. 6 illustrates that a maximal decrease in the phase difference between the two supermodes is achieved with two UV beams, each having a width (from focusing or a mask) of about 14 microns, each beam centered at about 18 microns from the midplane of the coupler cross section. The results scale linearly with the exposure length and the photo-induced index change).

Figure 7:
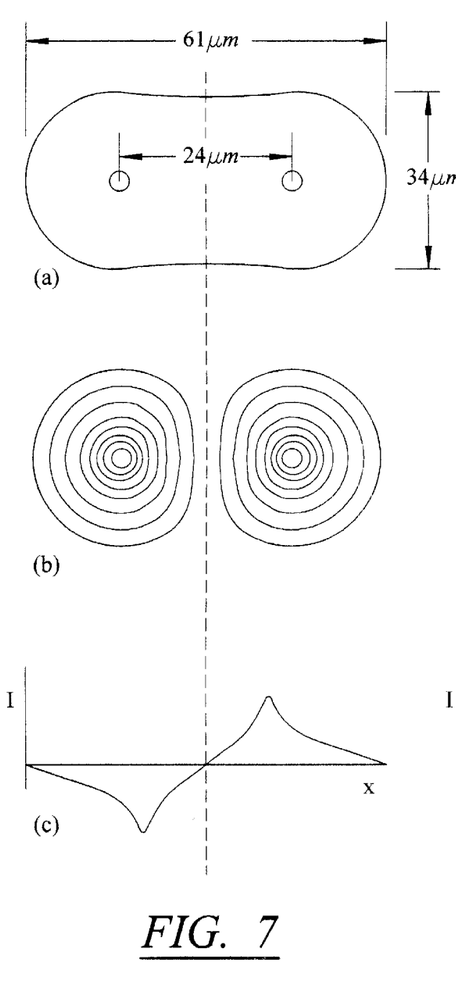
FIG. 7 is a series of illustrations on a common axis for a tightly fused coupler, including dimensions of the cross section, and distribution of the intensity, I, as a function of lateral distance, x, across the cross section of the coupler, of the asymmetric supermode.
Figure 8:
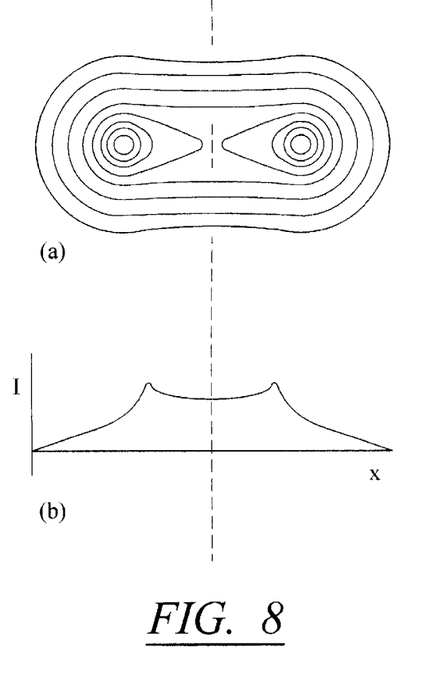
FIG. 8 is a pair of illustrations on a common axis of the distribution of intensity, I, as a function of lateral distance, x, across the cross section of a highly fused coupler, of the symmetric supermode of a tightly fused coupler.
Figure 9:
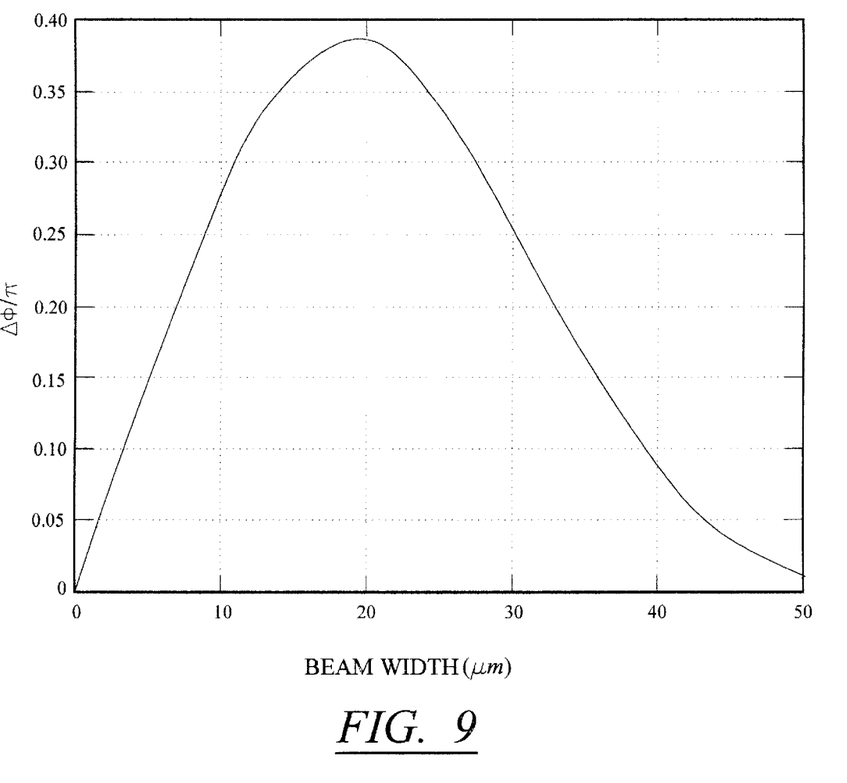
FIG. 9 is a plot of the increase in phase difference between the two supermodes as a function of beam width of a pair of UV beams, for a tightly fused coupler.
Figure 10:
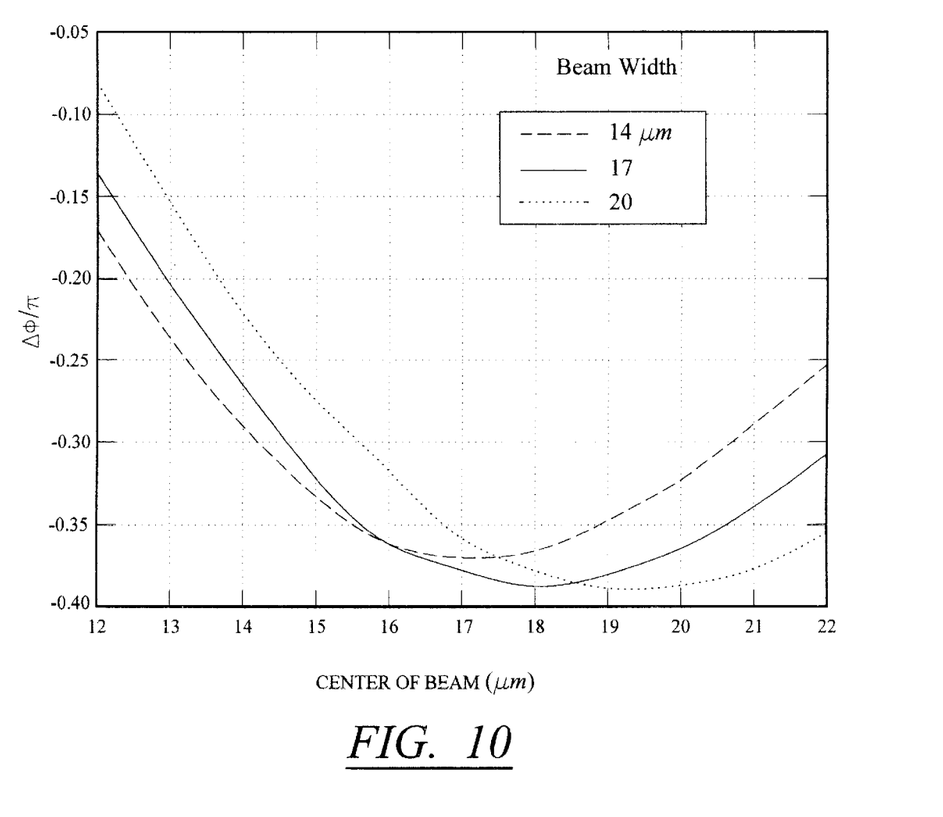
FIG. 10 is a plot of decrease in the difference of phase between the two supermodes as a function of positioning of the center of a single UV beam, for three different beam widths, in a tightly fused coupler.

A coupler made with a pair of tightly-fused, 125 micron fibers, and drawn so that it has the dimensions illustrated in FIG. 7, illustration (a), with cores of 2.4 micron diameter, has a significantly larger fraction of the symmetric mode intensity near the coupler midplane, as seen in FIG. 8 whereas the asymmetric mode has a more steep variation in the intensity near the mid-plane of the coupler, as shown in illustrations (b) and (c) of FIG. 7. Optimization of the effectiveness of UV trimming according to the present invention is therefore greater for tightly fused fibers of the type illustrated in FIGS. 7 and 8 than for lightly fused couplers of the type illustrated in FIGS. 3 and 4. Calculations of the change in phase difference between the two supermodes, of a tightly fused coupler, as a function of the width and location of an irradiating UV beam are illustrated in FIGS. 9 and 10. Comparison of FIG. 9 with FIG. 3 shows that maximum changes in the difference in phase of the two supermodes is much larger when the coupler is made with a tightly fused pair of fibers. The peak increase in the phase difference is shown in FIG. 9 to be obtained with UV beams having a width of about 18 microns, and the greatest decrease in the phase difference is seen in FIG. 10 to be obtained with two beams having a width of between 17 microns and 20 microns, which are centered between 18 microns and 20 microns from the fiber midplane.

Figure 11:
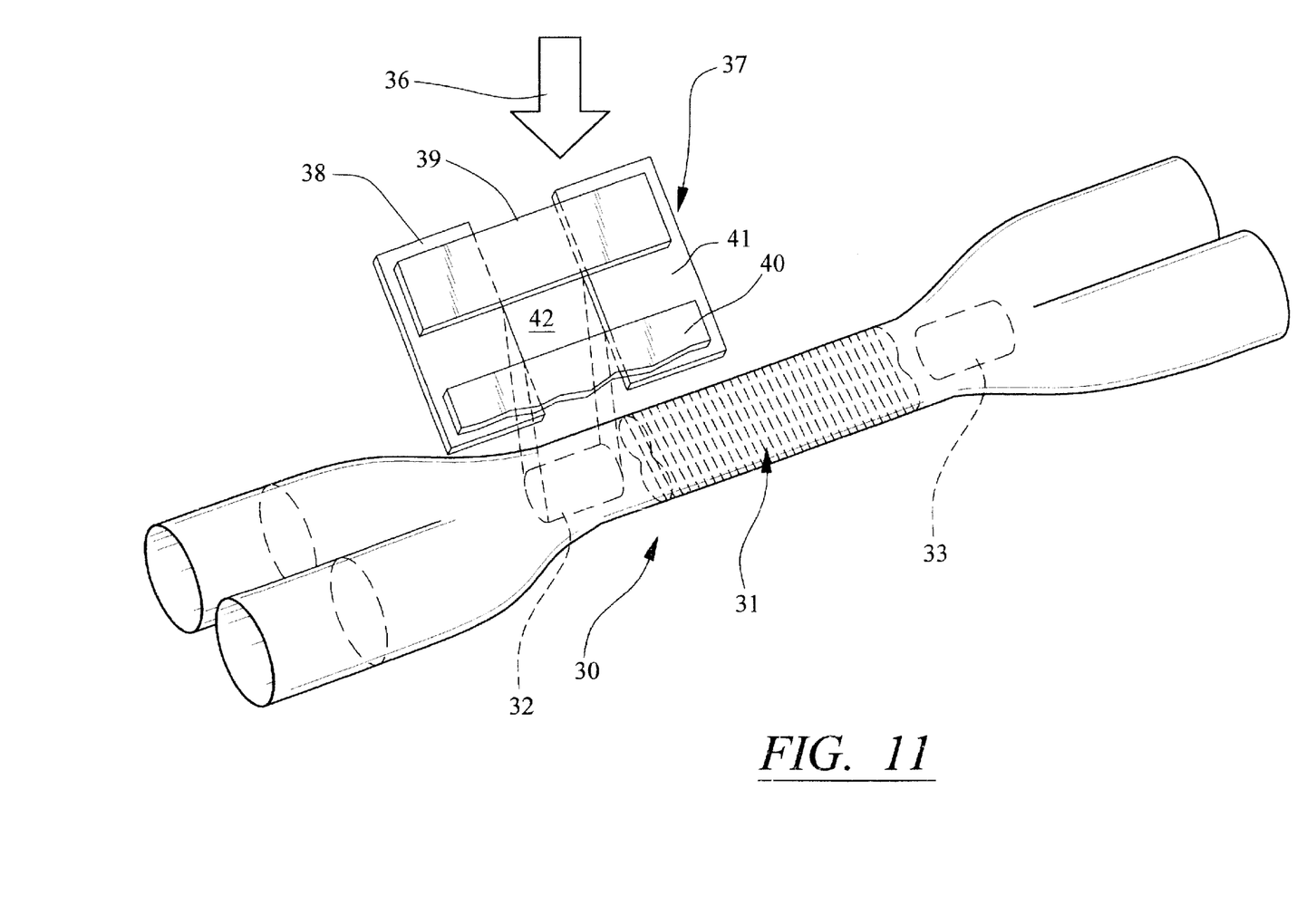
FIG. 11 is a perspective view of an embodiment of the invention utilizing an adjustable mask so as to decrease the difference in phase of the two supermodes.

Referring to FIG. 11, a coupler 30 having an FBG 31 is shown with UV radiation applied to one of two regions shown by dotted lines 32, 33. The UV radiation, depicted by arrow 36, is restricted to the area 32 by means of a mask 37 which is adjustable, by virtue of four segments 38–41 which provide a slit 42 to confine the UV radiation to the region 32. Utilizing the adjustable mask 37 permits adjusting the size of the region 32 that is irradiated by UV. Although shown in FIG. 11 with an FBG 31, the mask 37 may be utilized with a coupler, such as that shown in FIG. 1, which does not employ an FBG.

Figure 12:
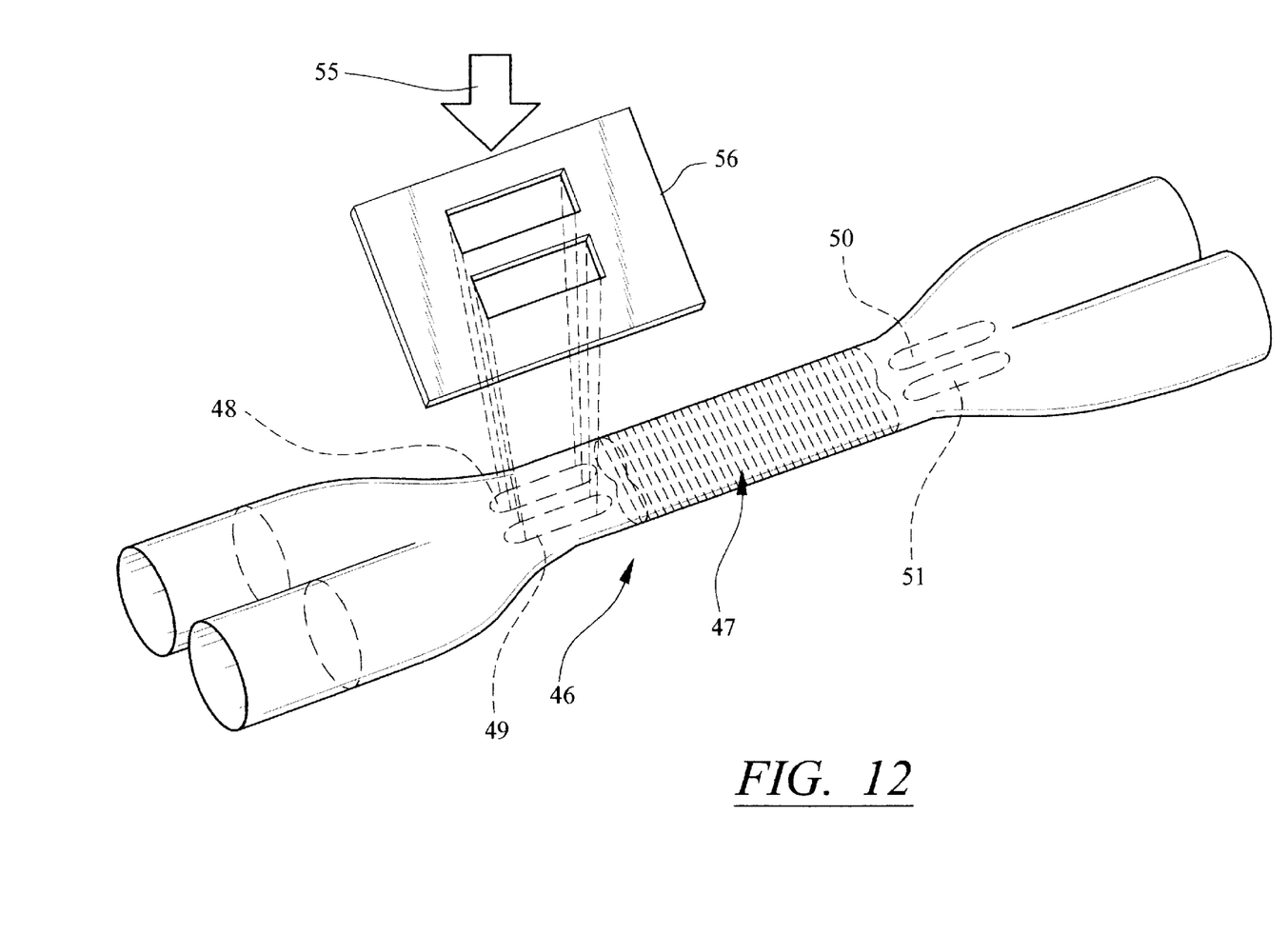
FIG. 12 is a perspective view of an embodiment of the invention utilizing a fixed mask having a pair of slits so as to irradiate the coupler in a manner to increase the difference in phase between the two supermodes.

Apparatus which may be utilized to decrease the difference in the phase of the two supermodes is illustrated in FIG. 12. Therein, a coupler 46 having an FBG 47 includes four regions 48, 49, 50, 51 which may be illuminated by UV, indicated by the arrow 55 which is confined by means of a fixed mask 56. The fixed mask 56 may be fabricated utilizing well-known microcircuit processing technology. Although shown with an FBG 47 in FIG. 12, the mask of FIG. 12 may be utilized to irradiate a coupler having no FBG, such as that shown in FIG. 1.

Figure 13:
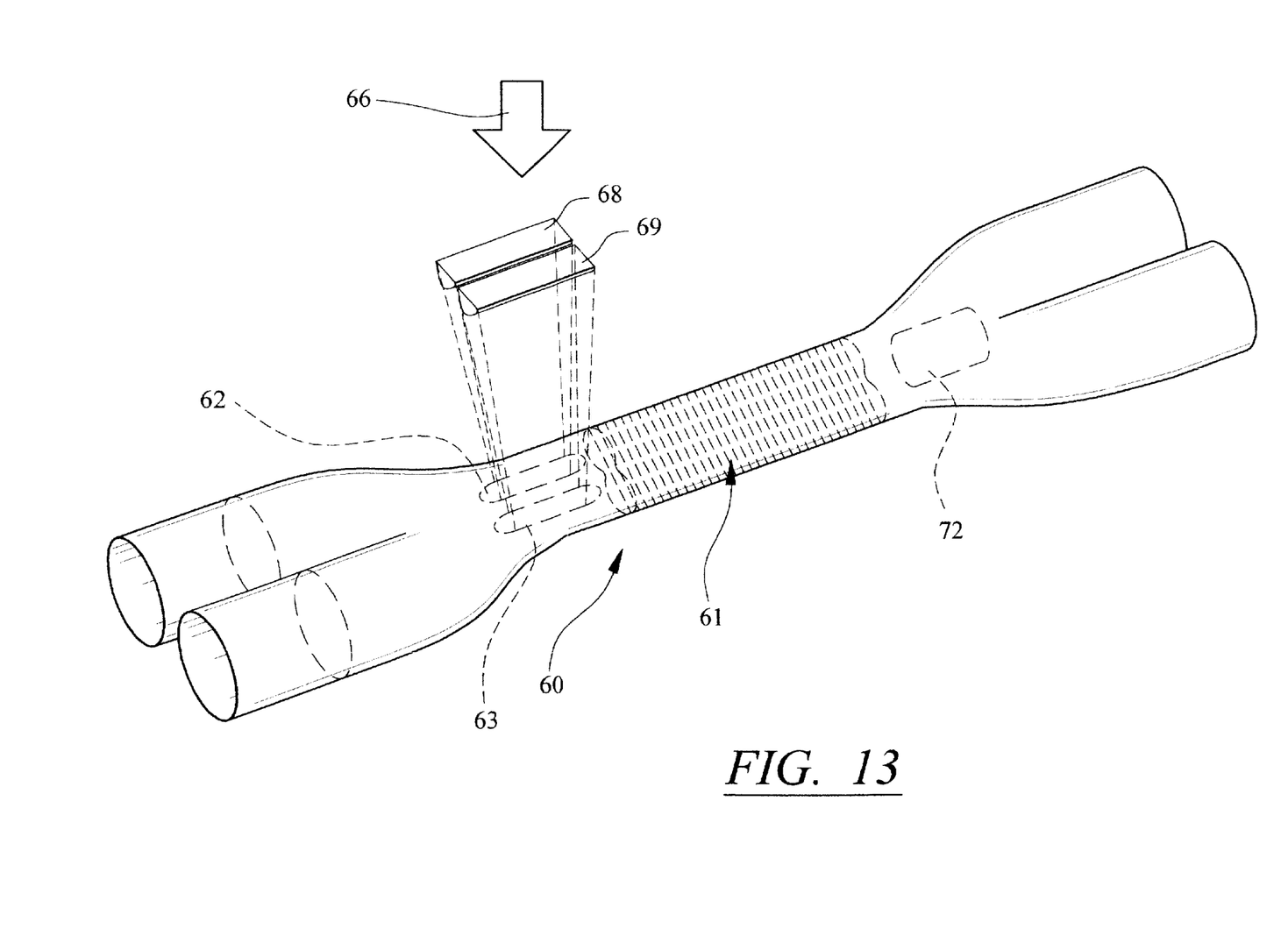
FIG. 13 is a perspective view of an embodiment of the invention utilizing a pair of lenses to direct UV radiation in a manner to increase the phase difference between the two supermodes, and illustrating that a different end of the same coupler may be irradiated in a manner to decrease the phase difference between the two supermodes.

An alternative apparatus for trimming a fused tapered coupler by decreasing the difference in phase of the two supermodes is illustrated in FIG. 13. Therein, a coupler 60 having an FBG 61 formed therein has two regions 62, 63 being irradiated by UV, which is depicted by the arrow 66. The UV is confined to the region 62, 63 by virtue of focusing by a pair of lenses 68, 69. FIG. 13 also illustrates that any coupler may be treated, according to the invention, differently at the opposite ends of the waist, such as by decreasing the phase difference between the two supermodes by treating the regions 62, 63 of FIG. 13, on one side of the waist, while treating the coupler at a single region 72 at the other side of the waist so as to increase the phase difference on the other side. In other words, each side of the coupler, with or without an FBG 61, can be treated differently, so as to decrease the phase difference by different amounts, so as to increase the phase difference by different amounts, or to increase the phase difference on one side and decrease the phase difference on the other side.

Figure 2:
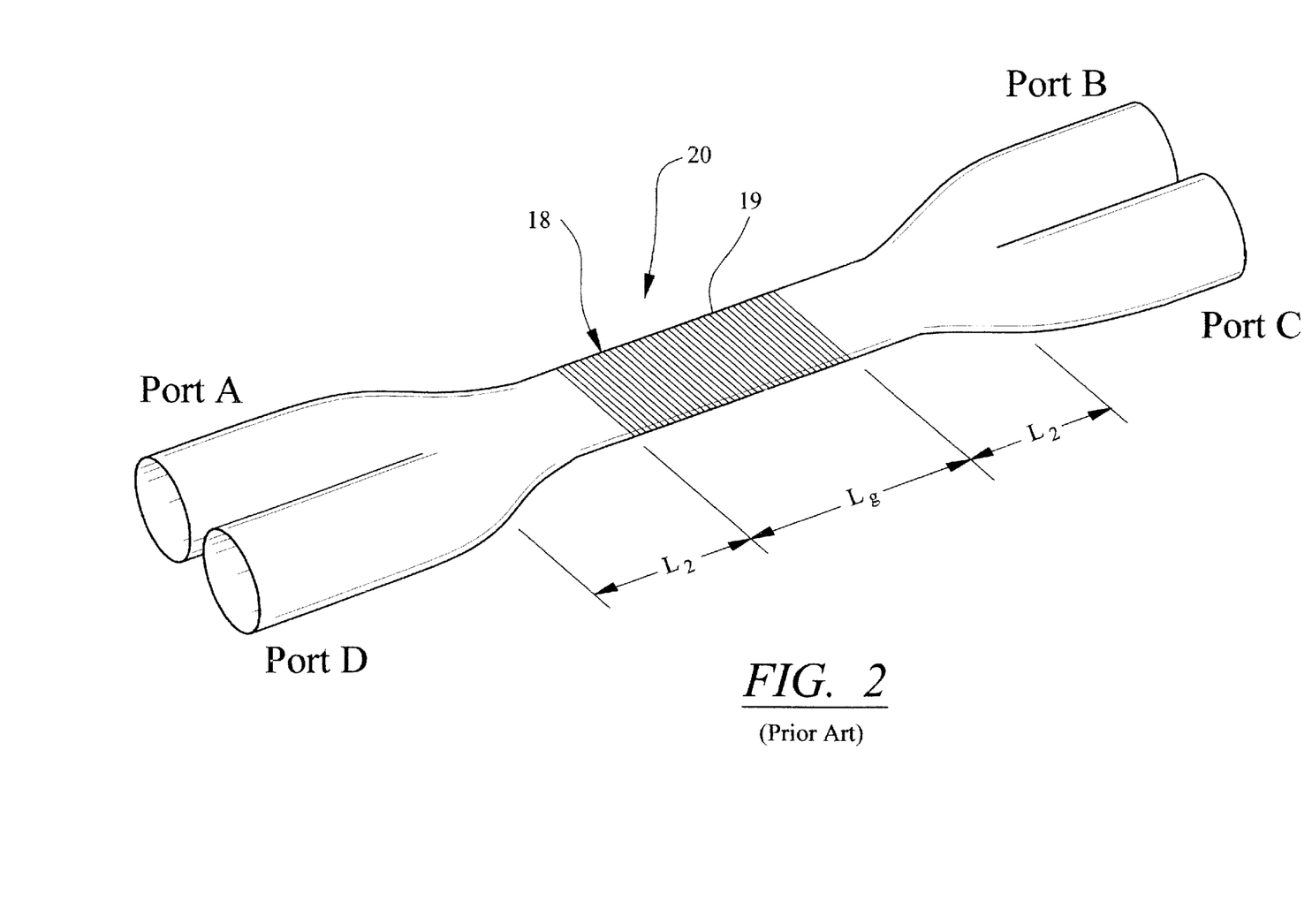
FIG. 2 is a perspective view of a fused-tapered coupler having an FBG, known to the prior art.

The performance of an optical add and drop multiplexer (OADM) may be improved by means of UV trimming according to the invention. Referring to FIG. 2, a channel (a particular band of wavelengths) which is to be dropped from the input received at port A is reflected by the grating 18 and routed to the output port D. All other wavelengths (which are not within the grating reflection band or stop band) appear at port C. A channel may be added by injecting the signal into port B (having the same band of wavelengths as the dropped channel), which is reflected from the other side of the grating (to the right in FIG. 2) and then routed into port C with the rest of the wavelengths.

As is known, the coupling length, $L_c$, for a given taper ratio or waist size is determined by the degree of fusion. The coupling length is the distance required for wavelengths entering at port A to be completely coupled into port C. Typically, the waist of the coupler (the portion having the reduced cross sectional area) is generally somewhat longer than the coupling length, particularly where the coupler employs an FBG. In the prior art, it has been reported that use of a very short FBG compared with the coupling length can accommodate both the drop function and the add function, although it does not perform either function very well. When the grating is short compared to the coupling length, the performance is mainly determined by the location of the grating and the length of the fused fiber on each side of the grating. Even in such a case, UV trimming according to the invention is beneficial to adjust for changes in the coupling that occur because of the UV induced change in the coupling length due to writing the FBG into the coupler. However, for any narrow band system with closely-spaced channels, the grating must be at least a significant fraction of the coupling length, and may preferably be longer than the coupling length. In such a case, UV trimming of the invention is essential to balance the cross talk and return losses of both the add channel and the drop channel.

As an example, consider a coupler having a uniform waist, the coupling length of which consists of three sections, an input length $L_1$, a grating with length $L_g$, and an output length $L_2$, as shown in FIG. 2. If it is to function as both an add filter and a drop filter, then:

$$2L_1 + \delta L_g = L_c \tag{1}$$

$$2L_2 + \delta L_g = L_c \tag{2}$$

$$L_1 + L_2 + L_g = mL_c, \; m \geq 2,3, \tag{3}$$

where $\delta$ is the ratio of the group delay at the center of the stop-band to its value at any wavelength outside the band. Typically, for gratings with T=−30 dB to −60 dB, $\delta$ is in the range ½ to ⅛, respectively.

Solving the above equations for each length gives $$L_g = (m-1)/(1-\delta)L_c$$

$$L_1 = L_2 = \tfrac{1}{2}[1-(m-1)\delta/(1-\delta)]L_c = \tfrac{1}{2}(I-m\delta)/(1-\delta)L_c$$

A solution exists if $\delta < I/m$. For example, if the overall coupler length is $2L_c$, or a complete beat length, then $$L_g = 1/(1-\delta)L_c$$

and $$L_1 = L_2 = \tfrac{1}{2}(1-2\delta)/(1-\delta)L_c.$$

Thus, the required grating length for $\delta = ¼$, is $\tfrac{4}{3}L_c$ and $L_1 = L_2 = \tfrac{1}{3}L_c$.

In this example, $L_g > L_c$, so it is essential to trim the phase difference in both $L_1$ and $L_2$ to compensate for inaccuracies in grating placement, changes in the effective location of the two supermode grating reflection points (given by $\delta$), and increases in the refractive index of the fiber resulting from UV radiation when writing the FBG. The example holds for non-uniform waists by using an effectively weighted average length.

The coupling length is inversely proportional to the difference in the symmetric and asymmetric mode indices, $n_s$ and $n_a$.

$$L_c = 0.5\lambda/(n_s - n_a)$$

For $\lambda$−1545 nm, the coupling length is 15.5 mm for the lightly-fused fiber example of FIGS. 3 and 4, and is 5.5 mm for the coupler made with a pair of tightly-fused fibers, as in FIGS. 7 and 8. Typical grating lengths are in the range of 8–12 mm for a channel spacing of 100 GHz. An FBG coupler OADM may be designed by choosing the lengths according to the above equation, and then using UV trimming of the invention to optimize the performance.

Figure 14:
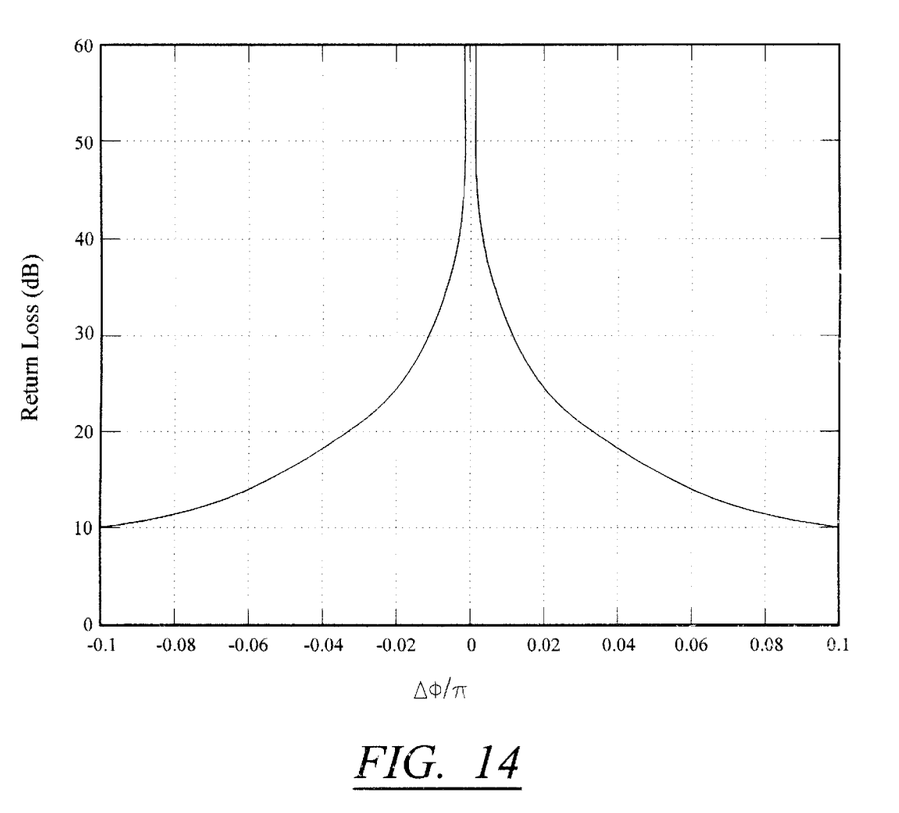
FIG. 14 is a plot of return loss as a function of change in phase between the two supermodes in a tightly fused coupler.

The coupler return loss results from light being reflected back into the input port A by the FBG. The coupler insertion loss results from light passing from port A through to port B, without coupling into the other fiber. In each instance, the present invention will significantly reduce the losses by amounts illustrated in FIG. 14, in which it can be seen that the return loss (and it is the same for the insertion loss) is extremely sensitive to the difference in phase between the two supermodes. As illustrated in FIG. 14, a change of $\pm 0.1\pi$ in the phase difference will reduce the return loss or the insertion loss by more than 30 dB.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of trimming a fused-tapered coupler which includes a plurality of optical fibers having photosensitive cores and photosensitive cladding fused together and drawn so as to provide a pair of fused, tapered transition regions separated by a fused waist region, said method comprising increasing the phase differential between the symmetric supermode and the asymmetric supermode by irradiating a portion of one or more end regions of said coupler with a beam of UV radiation which is confined transversely to between said cores, said end region including one or both of (1) a portion of one of said tapered regions whereby significant changes are made in the index of refraction by UV irradiation and (2) an adjacent portion of said waist.

2. A method according to claim 1 wherein said coupler has a uniform waist.

3. A multiplexer made by a process including a method according to claim 1.

4. A demultiplexer made by a process including a method according to claim 1.

5. A combined multiplexer/demultiplexer made by a process including a method according to claim 1.

6. A method according to claim 1, further comprising, before said step of irradiating:

forming at least one in-fiber Bragg grating in said waist.

7. A multiplexer made by a process including a method according to claim 6.

8. A demultiplexer made by a process including a method according to claim 6.

9. A combined multiplexer/demultiplexer made by a process including a method according to claim 6.

10. A method of trimming a fused-tapered coupler which includes a plurality of optical fibers having photosensitive cores and photosensitive cladding fused together and drawn so as to provide a pair of fused, tapered transition regions separated by a fused waist region, said method comprising decreasing the phase differential between the symmetric supermode and the asymmetric supermode by irradiating two portions of one or more end regions of said coupler with two corresponding beams of UV radiation, each confined transversely to include a related one of said cores, said portions excluding a significant fraction of the space between said cores, said end region including one or both of (1) a portion of one of said tapered regions whereby significant changes are made in the index of refraction by UV irradiation and (2) an adjacent portion of said waist.

11. A method according to claim 10 wherein said coupler has a uniform waist.

12. A multiplexer made by a process including a method according to claim 10.

13. A demultiplexer made by a process including a method according to claim 10.

14. A combined multiplexer/demultiplexer made by a process including a method according to claim 10.

15. A method according to claim 10, further comprising, before said step of irradiating:

forming at least one in-fiber Bragg grating in said waist.

16. A multiplexer made by a process including a method according to claim 15.

17. A demultiplexer made by a process including a method according to claim 15.

18. A combined multiplexer/demultiplexer made by a process including a method according to claim 15.

19. A method of trimming a fused-tapered coupler which includes a plurality of optical fibers having photosensitive cores and photosensitive cladding fused together and drawn so as to provide a pair of fused, tapered transition regions separated by a fused waist region, said method comprising:

increasing the phase differential between the symmetric supermode and the asymmetric supermode in one end region of said coupler by irradiating a portion of said one end region with a beam of UV radiation which is confined transversely to between said cores, and decreasing the phase differential between the symmetric supermode and the asymmetric supermode in another end region of said coupler by irradiating two portions of said another end region with two corresponding beams of UV radiation, each confined transversely to include a related one of said cores, said portions excluding a significant fraction of the space between said cores, each of said end regions including one or both of (1) a portion of one of said tapered regions whereby significant changes are made in the index of refraction by UV irradiation and (2) an adjacent portion of said waist.

20. A method according to claim 19 wherein said coupler has a uniform waist.

21. A multiplexer made by a process including a method according to claim 19.

22. A demultiplexer made by a process including a method according to claim 19.

23. A combined multiplexer/demultiplexer made by a process including a method according to claim 19.

24. A method according to claim 19, further comprising, before said step of irradiating:

forming an in-fiber Bragg grating in said waist.

25. A multiplexer made by a process including a method according to claim 24.

26. A demultiplexer made by a process including a method according to claim 24.

27. A combined multiplexer/demultiplexer made by a process including a method according to claim 24.

* * * * *